C. J. REED.
PROCESS OF DETINNING.
APPLICATION FILED JULY 20, 1909.
958,177.
Patented May 17, 1910.
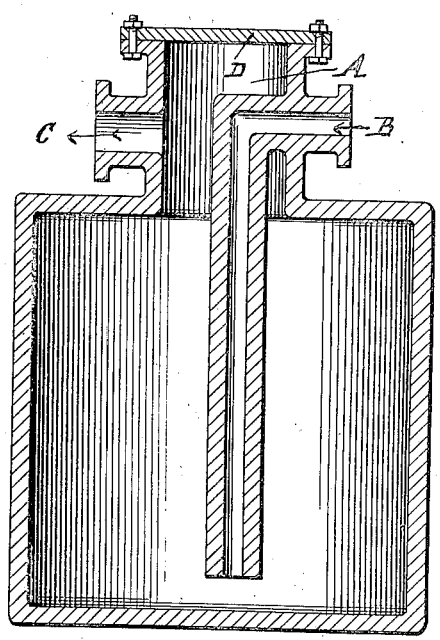
Witnesses:
N. P. Leonard.
E. Daniels.
Inventor:
Charles J. Reed
by Byrnes Townsend Brickenstein
Attys.

UNITED STATES PATENT OFFICE.

CHARLES J. REED, OF PHILADELPHIA, PENNSYLVANIA.

PROCESS OF DETINNING.

958,177.  Specification of Letters Patent.  Patented May 17, 1910.

Application filed July 20, 1909. Serial No. 508,587.

*To all whom it may concern:*

Be it known that I, CHARLES J. REED, a citizen of the United States, residing at Philadelphia, in the county of Philadelphia and State of Pennsylvania, have invented certain new and useful Improvements in Processes of Detinning, of which the following is a specification.

This process is intended for the separation of tin from tinned metals, as for example, iron. The process comprises three steps, namely, first, removing the tin in pulverulent or subdivided form from the iron or other coated metal by agitating a charge containing the tinned metal and a subdivided foreign body: second, mechanically separating the detinned metal from the pulverized tin and the added foreign body: and, third, removing the tin from the foreign body as a gaseous chlorid.

In carrying out the first step of the process advantage is taken of the fact that metallic tin is rendered weak, friable and easily pulverized by heating the charge preferably to about the melting point of tin. The subdivided foreign body used to pulverize or wipe off the fused or softened tin may be any substance which is infusible and nonvolatile under the conditions of use. I prefer however to use a substance like quartz sand, which is inert toward both the tin and the iron under the conditions employed. By "inert" I mean incapable of uniting with as an alloy or combining with chemically.

The fineness or extent of subdivision of the foreign body is variable, but I prefer material crushed until it passes a screen having holes not more than one-thirtieth of an inch in diameter, but I do not limit myself to any particular size, having successfully used material more than one-fourth of an inch in diameter. The amount of the foreign body added to the charge is also variable within wide limits, one to ten and one to one-tenth having been used, but I prefer about equal volumes of the tin scrap and the foreign body. I do not, however, limit myself to any particular proportions.

The apparatus used in carrying out the first step of the process may be a movable vessel or agitator of any convenient size or shape, for example, a rumbler or rotating cylinder or a shaking pan. The charge of tin scrap and the foreign body may be either pre-heated or continuously heated in the agitator, preferably to about the melting point of tin.

The apparatus for carrying out the second step in the process comprises a screen for mechanically separating the detinned iron from the mixture of pulverized tin and added foreign body.

The apparatus for carrying out the third step in the process comprises a closed vessel of any convenient size and shape and made of any material not seriously affected by chlorin or hydrogen chlorid, such as stoneware or glass. When anhydrous chlorin is used the vessel may be of iron. There should be two openings in the vessel, one for the admission of material and one for the escape of gases.

In the preferred operation of my process a body of tin scrap is mixed with an equal volume of finely divided quartz sand, common salt or other substance which is inert under the conditions of use, and the mixture is charged into a rumbler, wherein it is subjected to heat and agitation until the tin is entirely removed from the iron. The initial product is then thrown upon a screen, which separates the pieces of detinned iron from the powdered tin and sand or salt. The mixture of powdered tin and sand is finally charged into a suitable apparatus, such for example, as that shown in the drawing, in which the figure is a central vertical section. The mixture is introduced through the opening A and the air-tight cover D is replaced. Dry chlorin gas is passed into the apparatus through the opening B and gaseous stannic chlorid passes out through the opening C and is recovered in any suitable condenser, not shown.

The process is applicable to the separation of tin from other metals as well as iron.

I claim:

1. The process of separating tin from other metal which consists in pulverizing the tin with a subdivided foreign body, without pulverizing the other metal, removing the unpulverized metals and subsequently removing the tin from the added foreign body as a chlorid.

2. The process of separating tin from other metal, which consists in pulverizing the tin by heat and a subdivided foreign body, without pulverizing the other metal, mechanically removing the unpulverized metals and subsequently removing the tin from the added foreign body in the form of a chlorid.

3. The process of separating tin from other metal which consists in heating and agitating the mixture with a foreign body, to pulverize the tin only, mechanically separating the finely divided constituents of the product from the larger scrap and subsequently removing the tin as a gaseous compound.

4. The process of detinning tinned iron scrap which consists in mixing it with a subdivided foreign body, heating and agitating the mass, mechanically separating the finely divided products from the scrap and subsequently removing the tin as a gaseous compound.

In testimony whereof, I affix my signature in presence of two witnesses.

CHARLES J. REED.

Witnesses:
ELLEN M. RITTER,
MARY A. McCONEGHY.